United States Patent [19]

Biggs et al.

[11] Patent Number: 5,493,041

[45] Date of Patent: Feb. 20, 1996

[54] LIGHTLY CROSSLINKED POLY(N-ALKYLMETHYLSILOXANES) AND METHODS OF PRODUCING SAME

[75] Inventors: Timothy N. Biggs; Gary E. LeGrow, both of Midland, Mich.

[73] Assignee: Dow Corning Corporation, Midland, Mich.

[21] Appl. No.: 505,725

[22] Filed: Jul. 21, 1995

[51] Int. Cl.$^6$ ............................................. C07F 7/08
[52] U.S. Cl. ..................... 556/453; 556/451; 556/456; 528/15
[58] Field of Search ........................ 556/453, 456, 556/451; 528/15

[56] References Cited

U.S. PATENT DOCUMENTS

| | | | |
|---|---|---|---|
| 2,491,843 | 12/1949 | Wilcock | 260/448.2 |
| 3,418,353 | 12/1968 | Brown | 556/453 |
| 3,450,736 | 6/1969 | DeMonterey | 556/453 |
| 3,631,087 | 12/1971 | Lewis et al. | 556/453 |
| 3,631,220 | 12/1971 | Wojdac | 528/15 X |
| 4,172,101 | 10/1979 | Getson | 528/15 X |

OTHER PUBLICATIONS

European Polymer Journal vol. 29 N. 1. pp. 15–22 (1993).

*Primary Examiner*—Paul F. Shaver
*Attorney, Agent, or Firm*—Richard I. Gearhart

[57] ABSTRACT

The crosslinking and simultaneous alkylation of poly(hydridomethylsiloxanes) form crosslinked siloxanes having n-alkylmethyl groups. Without changing the chain length of the poly(hydridomethylsiloxane) starting material, a family of lightly crosslinked siloxanes having n-alkylmethyl groups, with a range of viscosities, can be produced using one or more alpha-olefins along with a small amount of an unconjugated alpha, omega-diene added as a crosslinker. The poly(hydridomethyl siloxanes) are made from highly pure silanol-free hexamethyldisiloxane and highly pure mixtures of silanol-free tetramethylcyclotetrasiloxane ($D^H4$) and pentamethylcyclopentasiloxane $D^H5$ containing no more than about 100 parts per million (ppm) water, with anhydrous trifluoromethane sulfonic acid (triflic acid, $CF_3SO_3H$), at room temperature, to provide linear poly(hydridomethylsiloxanes) having degrees of polymerization of up to about 250.

19 Claims, No Drawings

LIGHTLY CROSSLINKED POLY(N-ALKYLMETHYLSILOXANES) AND METHODS OF PRODUCING SAME

FIELD OF THE INVENTION

This invention is directed to methods for crosslinking linear polysiloxanes, and the compositions resulting therefrom.

BACKGROUND OF THE INVENTION

The present invention relates to the crosslinking and simultaneous alkylation of poly(hydridomethylsiloxanes) to form crosslinked siloxanes having n-alkylmethyl groups. Without changing the chain length of the poly(hydridomethylsiloxane) starting material, a family of lightly crosslinked siloxanes having n-alkylmethyl groups can be produced using one or more alpha-olefins along with a small amount of an unconjugated alpha, omega-diene added as a crosslinker. The lightly crosslinked siloxanes having n-alkylmethyl groups have a wide range of viscosities. The poly(hydridomethylsiloxanes) are made from highly pure silanol-free hexamethyldisiloxane and highly pure mixtures of silanol-free tetramethylcyclotetrasiloxane ($D^H4$) and pentamethylcyclopentasiloxane ($D^H5$) containing no more than about 100 parts per million (ppm) water, with anhydrous trifluoromethane sulfonic acid (triflic acid, $CF_3SO_3H$), at room temperature, to provide linear poly(hydridomethylsiloxanes) ($MD^H_xM$) where x is from 8 to 250. These crude polymers are neutralized by solid $NaHCO_3$ and filtered to remove Na+ triflate to provide the neutral poly(hydridomethylsiloxanes).

To the poly(hydridomethylsiloxanes) are added a reaction mixture consisting of a catalyst, alpha-olefin and a crosslinker which is an unconjugated alpha, omega-diene. The resulting lightly crosslinked siloxanes having n-alkylmethyl groups are waxes or fluids at room temperatures, and can be used in a variety of applications where controlling viscosity of the polymer is critical. The compositions of the present inventions are especially useful as an additive to toner used in photocopiers.

The present invention utilizes these new ultra pure polymers to make a dramatic advance in the art. Heretofore, the available siloxanes having n-alkylmethyl groups were not predominately linear like those used as starting materials herein, but contained significant branch sites. When crosslinker was added to the branched polymers the resulting compositions had extremely high viscosities, sometimes forming useless gels. Moreover, adding even incremental amounts of crosslinker to otherwise useful compositions would result in excessively high viscosity materials; this creates major production difficulties where minor variations in the amount of crosslinker could result in lots varying widely in viscosity or rendered otherwise unusable. The non-branched starting materials of the present invention eliminated this problem. Furthermore, the previously available siloxanes were typically contaminated with highly reactive residual SiH, resulting in unstable compositions whose viscosities increased over time. The crosslinked siloxanes of the present invention do not include detectable amounts of residual SiH and are therefore stable over time.

Our invention, therefore, is in sharp contrast to the gel containing crosslinked oily materials taught in U.S. Pat. No. 2,491,843 (Dec. 20, 1949); or the crosslinked high polymers bearing SiOH end groups, described in the European Polymer Journal, Vol. 29, No. 1, Pages 15–22, (1993). Furthermore, our alkylated products are prepared from highly pure essentially anhydrous silanol-free starting materials and contain low or no residual silicon hydride functionality.

SUMMARY OF THE INVENTION

It is an object of the invention to provide a method of making crosslinked siloxanes having n-alkylmethyl groups from ultra pure poly(hydridomethylsiloxanes) having substantially reduced branch sites mixed with a reaction mixture consisting of a platinum catalyst the alpha-olefin and a crosslinker which is an unconjugated alpha, omega-diene.

It is a further object of the invention to teach a method of controlling the viscosity of crosslinked siloxanes having n-alkylmethyl groups.

These and other objects of the invention will become apparent from a consideration of the detailed description.

DETAILED DESCRIPTION OF THE INVENTION

Previously, it was known that methylhydrogendichlorosilane could be hydrolyzed and condensed to obtain linear poly(hydridomethylsiloxanes) retaining a high proportion of reactive hydrogen, but typically they contain 1% or more of branch sites. The reactions are often difficult to control, and the results are erratic (i) sometimes producing useless gels or hard brittle solids instead of fluids, and (ii) hydroxyl substitution on silicon which leads to gelation. This limits the usefulness of these poly(hydridomethylsiloxanes) as starting materials for polymer synthesis. When these impure poly(hydridomethylsiloxane) materials are added to the reaction mixture of catalyst, one or more olefins and crosslinker described herein, the resulting compositions may be undesirable gels rather than the waxes and fluids of the present invention. Further, these materials do not exhibit stable viscosities over extended time periods, because relatively high amounts of residual silicon hydride functionality allow further reactions which alter the viscosity. Furthermore, adding incremental amounts of crosslinker to these materials will result in drastic viscosity changes.

These disadvantages have been overcome by utilizing linear poly(hydridomethylsiloxanes) derived from highly pure essentially anhydrous silanol-free hexamethyldisiloxane, and highly pure essentially anhydrous silanol-free hydridomethyl cyclosiloxanes ($D^H4$) and ($D_H5$), as starting materials.

The high molecular weight trimethylsiloxy-endcapped poly(hydridomethylsiloxanes) are prepared via an anhydrous triflic acid catalyzed, mild room temperature polymerization, of highly pure essentially anhydrous silanol-free hexamethyldisiloxane, highly pure essentially anhydrous silanol-free tetramethylcyclotetrasiloxane, and/or highly pure essentially anhydrous silanol-free pentamethylcyclopentasiloxane.

By silanol-free is meant that the siloxane starting materials contain no residual $\equiv$SiOH, within the limits of detection by Silicon-29 Nuclear Magnetic Resonance ($^{29}$Si NMR) and Fourier Transform Infrared Spectroscopy (FTIR), which is one part per million or less. The resulting poly(hydridomethylsiloxanes) are fluids containing less than 0.2% branch sites by $^{29}$Si NMR, that could eventuate in the formation of an undesirable gel. A branch site frequency of 0.2% means that 1 out of 500 silicon atoms contains a branch site. The degree of polymerization of resulting polymer is controlled by the amount cyclosiloxanes present in the reaction mixture and can result in polymers having siloxane backbones of from 8 to 250 silicone molecules, although degrees of polymerization of from 8 to 100 are preferred, and 8 to about 60 being most preferred.

The term "substantially pure poly(hydridomethylsiloxanes)" as used here and in the claims means poly(hydridomethylsiloxanes) which are silanol-free and which have a branch site frequency of 0.2% or less. Reaction conditions are mild so that branch sites are not formed during polymerization. Thus, the preferred temperature range is about 20°–30° C. (68°–86° F.), although if desired, temperatures up to about 100° C. can be employed, consistent with the desire to avoid the formation of branch sites.

The methods of preparing these poly(hydridomethylsiloxanes) are fully described in U.S. Ser. No. 08/433,181, entitled "Methods of Making Polysiloxanes" which is fully incorporated herein by reference.

To prepare the polymers of the present invention, the high purity poly(hydridomethylsiloxanes) are added to a reaction mixture consisting of the alpha-olefin, crosslinker and catalyst. The mixture is stirred until an exotherm occurs, typically at between 60°–120° C. The mixture is then stirred continuously at the exotherm temperature until the reaction is complete, at which point an FTIR analysis will give 0 ppm SiH.

The alpha-olefins $CH_2=CR'R"$ (where $R'=H$ or methyl, and $R"$ is alkyl group having from 2–30+ carbon atoms) used in the reaction mixture include alkenes with 2–30+ carbon atoms, preferably 6–30 carbon atoms, and most preferably 6–18 carbon atoms. Particular care should be taken to insure that the alpha-olefin(s) is anhydrous.

Some suitable alpha-olefins are ethylene, propene, 1-butene, isobutylene (2-methylpropene), 1-pentene (C5), 2-methyl-1-butene, 3-methyl-1-butene, 1-hexene, 2-methyl-1-pentene, 3-methyl-1-pentene, 4-methyl-1-pentene, 1-heptene, 2-methyl-1-hexene, 1-octene, 2-methyl-1-heptene, 1-nonene, 1-decene (C10), 1-undecene, 1-dodecene, 1-tridecene, 1-tetradecene, 1-pentadecene (C15), 1-hexadecene, 1-octadecene, 1-nonadecene, 1-eicosene (C20), and those alpha-olefin fractions containing varying percentages of C22–C30+ alpha-olefins sold under the trademarks GULFTENE® 24–28 and GULFTENE® 30+, by Chevron Chemical Company, Houston, Tex.. It will be readily understood by those skilled in the art that different mixtures of the foregoing alpha-olefins will also produce compositions within the scope of the invention.

The crosslinker of the present invention is an unconjugated alpha, omega-diene. These crosslinkers are characterized by the fact that they have two functional groups that will react with silicone hydride and are hydrolytically and oxidatively stable. The preferred crosslinker is 1,5 hexadiene, although 1,7-octadiene, 1,9-decadiene, and 1,3-tetradecadiene could also be used in the practice of the present invention.

The advantage of using an unconjugated alpha, omega-diene for this modification is that the chemical reactivity of the olefinic groups of the diene is similar to the chemical reactivity of the olefinic groups of the alpha-olefine. This similarity permits hydrosilylation of the alpha-olefin and the alpha, omega-diene to proceed simultaneously (same time and same rate) thereby leading to both better process and product reproducability.

The ratio of alpha, omega-diene to alpha-olefin(s) which can be employed in this process is dependent upon the chain length of the poly(hydridomethylsiloxane) reagent. For short polymers (e.g., having a degree of polymerization of less than 20) the ratio may range up to 2/100. The amount of alpha, omega-diene used in practice is generally quite small, being about 0.5–3% relative to the alpha-olefin. Excessive amounts of alpha, omega-diene will cause gelation of the polymeric product; typical preparations of the compositions of this invention include 0.3 to 0.6 by weight of crosslinker per 100 parts by weight of poly(hydridomethylsiloxane) and olefin(s). Equivalent amounts of ≡Si-H containing reactants and unsaturated alpha-olefin reactants should be employed in the process, and one ethylenic linkage is the theoretical equivalent of one silicon bonded hydrogen atom. It may be necessary however to use an excess of alpha-olefin to totally consume ≡SiH in the siloxane product.

The maximum amount of platinum catalyst employed is determined by economical considerations, and the minimum amount by the type and purity of reactants employed. Very low concentrations of platinum catalyst such as $1\times10^{-6}$ moles catalyst per equivalent of the alpha-olefin compound, may be used when the reactants are extremely pure. However, it is possible to use about $1\times10^{-5}$ moles catalyst per equivalent weight of alpha-olefin compound, and even $1\times10^{-4}$ moles platinum catalyst, per equivalent weight of alpha-olefin(s).

"Moles" of platinum catalyst are measured in terms of one mole providing one unit atom (e.g. one gram atom) of platinum. An "equivalent weight" of alpha-olefin is the amount of reactant furnishing one unit weight of ethylenic unsaturation (i.e. equivalent to one unit weight of ≡Si—H), regardless of what other reactive or potentially reactive substitutents may be present. Thus, an equivalent weight of ethylene is its molecular weight.

The preferred hydrosilylation catalyst is a neutral, soluble zero valent platinum catalyst or platinum supported on active carbon having a particle diameter of 1–2 mm. The amount of platinum supported on the active carbon can vary from 0.1–5% by weight, based on the weight of active carbon. Care should be taken to insure that the platinum on carbon catalyst is dried so that it is anhydrous.

The reaction temperature can vary, and optimum temperatures depend upon the concentration of platinum catalyst, and the nature of the reactants. The reaction can be initiated at a temperature below room temperature (20° C. to −10° C.), and is exothermic once begun. The temperature should be one at which all reactants are in the liquid or gaseous state. The maximum temperature is determined by the volatility and stability of the reactants. Ordinarily, it is best to keep the reaction temperature below about 130°–150° C. Best results with most reactants are obtained by initiating the reaction at about 50° to 180° C., and maintaining the reaction within reasonable limits of this range. The exothermic nature of the reaction may push the temperature up to 150° C. for a short time, however.

The optimum reaction time is variable, dependent upon the reactants, reaction temperature, and platinum catalyst form and concentration. Ordinarily, there is no benefit in extending the contact time of the reactants beyond 16 or 17 hours, but likewise there is usually no harm, unless an extremely elevated temperature is employed. With many reactants, a practical quantitative yield of product can be obtained in 120 minutes or less.

The reaction can be carried out at atmospheric, subatmospheric, or super-atmospheric pressure. Here again, the choice of conditions is largely a matter of logic, based upon the nature of the reactants, and the equipment available. Non-volatile reactants are especially adaptable to being heated at atmospheric pressure, with or without a reflux arrangement. Reactants which are gaseous at ordinary temperatures, are preferably reacted at substantially constant volume under autogenous or induced pressure. The best results are obtained by maintaining all reactants in the liquid phase.

Other variations and modifications may be made in the methods described without departing from the essential features of our invention. The forms of invention are exemplary and not limitations on the scope of the invention defined in the claims.

EXAMPLES

In the following examples, viscosities were measured using a Brookfield Viscometer (Stoughton, Mass.). Parts of residual SiH were measured by Silicon-29 Nuclear Magnetic Resonance ($^{29}$Si NMR) and Fourier Transform Infrared Spectroscopy (FTIR). The siloxane polymers used herein, except for those in the Comparative Examples, were substantially pure polymers made from highly pure silanol-free hexamethyldisiloxane and highly pure mixtures of silanol-free tetramethylcyclotetrasiloxane ($D^H4$) and pentamethylcyclopentasiloxane ($D^H5$) containing no more than about 100 parts per million (ppm) water, with anhydrous trifluoromethane sulfonic acid (triflic acid, $CF_3SO_3H$), at room temperature, as described herein and in U.S. Ser. No. 08/433,181, entitled "Methods of Making Polysiloxanes".

Reference is also made, for comparison purposes, to DC-1107, a commercially available product from the Dow Corning Corporation (Midland, Mich.) having the average formula $(CH_3)_3O(HCH_3SiO)_{60}(CH_3)_3$ ($MD'_{60}M$). DC-1107 is produced by cohydrolysis of $HCH_3SiCl_2$ and $(CH_3)_3SiCl$ rather than the methods set forth herein. For purposes of the following examples, the term "platinum catalyst" refers to a complex of Pt(0) and $(CH_2=CH(CH_3)_2Si)_2O$.

Comparative Example I

To a stirred homogeneous solution of 1-octadecene (482 g, 1.91 mols) and platinum catalyst (0.14 ml 2.5 ppm Pt) was added DC-1107 (100 g, 0.027 mols) at a dropwise rate. The reaction exothermed to 90° C. and was maintained at this temperature for 24 hours. At this point, the excess olefin was stripped off (pot temp. 180°–200° C., 2 mm Hg) to afford an uncrosslinked white wax (mp 46°–48° C.) with 164 ppm residual SiH as measured by FTIR and melt viscosities of 1275 cps at 50° C. and 160 cps at 175° C.

Comparative Example II

To 20 g (0.053 mols) DC-1107 was added 15 ml of a mixture of 1-octadecene (96.4 g, 0.383 moles) and 1,5-hexadiene (220 mg, 0.19 wt % of the reagents) followed by stirring at room temperature. To this solution was added a platinum catalyst (0.026 ml, 2.5 ppm Pt) with the balance of the octadecene/hexadiene solution added dropwise at a slow rate. After a rapid exotherm to 140° C., the reaction was maintained at 120° C. for 16 hours. The reaction mixture was stripped by distillation of excess olefin (200°–260° C., 2 mm Hg) to provide a white wax (melting point 39°–41° C.) with 0.5% residual olefin and 108 ppm residual SiH as measured by FTIR. The melt viscosity at 180° C. was 800 cps.

Comparative Example III

To 20 g (0.0053 mols) DC-1107 was added 15 ml of a mixture of 1-hexene (32 g, 0.383 mols) and 1,5-hexadiene (182 mg, 0.35 wt % of reagents) followed by stirring at room temperature. To this solution was added a platinum catalyst (0.016 ml 2.5 ppm Pt) with the balance of the hexene/hexadiene solution added dropwise at a slow rate. After a rapid exotherm to 110° C., the reaction was maintained at 120° C. for 18 hours. The reaction mixture was stripped by distillation of excess olefin (140°–250° C., 2 mm Hg) to provide a slightly yellow wax (melting point 27°–29° C.) with 120 ppm residual SiH. The melt viscosity at 25° C. was 82,000 cps and at 180° C. was 22,000 cps. Using conventional methods, an increase in melt viscosity from 800 cps (see Comparative Example II) to 22,000 cps. was observed by merely doubling the amount of crosslinker. This represents an increase in viscosity of almost 27 times the original crosslinked material. Therefore, very small increments of crosslinker increases the viscosity drastically in the conventional method, making control of the viscosity difficult during production.

Examples IV, V, and VI below use the ultra pure poly-(hydrido methylsiloxanes) as starting materials and therefore do not show the dramatic viscosity increase when the amounts of crosslinker is increased.

Example IV

Preparation of $Me_3SiO(MeC_{18}H_{37}SiO)_{60}SiMe_3$ ($MD^{18}_{60}M$) To a stirred homogeneous solution of 1-octadecene (24.16 g, 0.0065 mol) and platinum catalyst (2.4% Pt in toluene, 2.5 ppm, 0.02 ml) was added substantially pure $Me_3SiO(MeHSiO)_{60}SiMe_3$ (117 g, 0.46 mol) at a dropwise rate over 0.5 hours. The reaction exothermed to 80° C. and was maintained at that temperature via external heating for 4 hours. FTIR analysis gave 0 ppm residual SiH. The olefin was then stripped (0.2 mmHg, 180°–220° C.) from the mixture to afford a white wax melting at 41°–44° C. with a melt flow viscosity of 140 cps when measured at 180° C.

Example V

Preparation of $Me_3SiO(MeC_{18}H_{37}SiO)_{60}SiMe_3$ ($MD^{18}_{60}M$)

To a stirred homogeneous solution of 1-octadecene (3056 g, 12.5 mol), 1,5-hexadiene (0.55% by weight of reagents, 7.62 g) and platinum catalyst (2.4% Pt in toluene, 2.5 ppm, 0.454 ml) was added substantially pure $Me_3SiO(MeHSiO)_{60}SiMe_3$ made from cyclics (654 g, 0.1739 mol) at a dropwise rate over 2 hours. The reaction exothermed to 80° C. and was maintained at that temperature via external heating for 16 hours. FTIR analysis gave 0 ppm residual SiH. The olefin was then stripped (0.2 mmHg, 180°–220° C.) from the mixture by distillation to afford a white crosslinked wax with a melt flow viscosity of 1000 cps when measured at 180° C.

Example VI

Preparation of $Me_3SiO(MeC_{18}H_{37}SiO)_{60}SiMe_3$ ($MD^{18}_{60}M$)
To a stirred homogeneous solution of 1-octadecene (117 g, 0.464 mol), 1,5-hexadiene (0.55% by weight of reagents, 790 mg.) and platinum catalyst (2.4% Pt in toluene, 2.5 ppm, 5 mg ) was added substantially pure $Me_3SiO(MeHSiO)_{60}SiMe_3$ made from cyclics (24.16 g, 0.0065 mol) at a dropwise rate over 0.5 hours. The reaction exothermed to 80° C. and was maintained at that temperature via external heating for 16 hours. FTIR analysis gave 0 ppm residual SiH. The olefin was then stripped (0.2 mmHg, 180°–220° C.) from the mixture by distillation to afford a white crosslinked wax with a melt flow viscosity of 7500 cps when measured at 180° C. As opposed to the Comparative Examples II and III, the doubling the amount of crosslinker in the polymers of the present invention results only in a viscosity increase of roughly 7.5 times over the original crosslinked compostion. Doubling the viscosity still results in a polymer having usable properties.

Example VII

A number of crosslinked and uncrosslinked siloxanes having n-alkylmethyl groups having different degrees of polymerization and different alpha-olefins were prepared in using ultra pure poly(hydridomethylsiloxanes). The viscosities of the crosslinked and uncrosslinked siloxanes having n-alkylmethyl groups are set forth in Table 1. Representative methods of making the polymers are described below.

$MD^{C6}_{9.6}M$

To $(CH_3)_3SiO(HCH_3SiO)_{9.6}Si(CH_3)_3$ ($MD'_{9.6}M$) (50 g, 0.068 mol) was added a mixture of 1-hexene (66 g, 0.78 mol)/1,5-hexadiene (0.3 wt % of reagents, 347 mg), platinum catalyst (2.5 ppm, 0.014 ml) very slowly over 20 minutes. The reaction exothermed to 80° C. and after addition of olefin, was stirred at 80° C. for 3 hours. At this point, FTIR analysis gave 0 ppm SiH.

$MD^{C18}_{9.6}M$

To $MD'_{9.6}M$ (50 g, 0.068 mol) was added a mixture of 1-octadecene (184 g, 0.73 mol)/1,5-hexadiene (0.3 wt %, 700 mg), platinum catalyst (2.5 ppm, 0.029 ml) very slowly over 30 minutes. The reaction exothermed to 110° C. and after addition of olefin, was stirred at 110° C. for 3 hours. At this point, FTIR analysis gave 0 ppm SiH.

TABLE I

| 1,5-Hexadiene Crosslinker Effect on Viscosity | | |
|---|---|---|
| Siloxane | Xlinker (wt %) | Viscosity (cps) |
| $MD^{C6}_{9.6}M$ | — | 20 at 25° C. |
| $MD^{C6}_{9.6}M$ | 0.3 | 170 at 25° C. |
| $MD^{C18}_{9.6}M$ | — | 100 at 70° C. |
| $MD^{C18}_{9.6}M$ | 0.3 | 200 at 70° C. |
| $MD^{C6}_{60}M$ | — | 100 at 25° C. |
| $MD^{C6}_{60}M$ | 0.3 | 1000 at 180° C. |

The data in Table 1 clearly shows that crosslinking and simultaneous alkylation of poly(hydridomethylsiloxanes) in accordance with the methods of the present invention results in higher viscosities than uncrosslinked compositions made by the previous methods.

Example VIII

Preparation of $Me_3SiO(MeC_6H_{13}SiO)_{60}SiMe_3$. ($MD^{18}_{60}M$)

To a stirred homogeneous solution of 1-hexene (32 g, 0.38 mol) and platinum catalyst (2.4% Pt in toluene, 2.5 ppm, 0.05 ml) was added substantially pure $Me_3SiO(MeHSiO)_{60}SiMe_3$ (20 g, 0.0053 mol) at a dropwise rate over 0.5 hours. The reaction exothermed to 90° C. and was maintained at that temperature via external heating for 3 hours. FTIR analysis gave 0 ppm residual SiH. The product was a viscous fluid and had a viscosity of 80 cps measured at 25° C.

Example IX

Preparation of $Me_3SiO(MeC_6H_{13}SiO)_{200}SiMe_3$ ($MD^6_{200}M$)

To a stirred homogeneous solution of 1-hexene (15 g, 0.62 mol) and platinum catalyst (2.4% Pt in toluene, 2.5 ppm, 0.09 ml) was added substantially pure $Me_3SiO(MeHSiO)_{200}SiMe_3$ (20 g, 0.0053 mol) at a dropwise rate over 0.5 hours. The reaction exothermed to 100° C. and was maintained at that temperature via external heating for 16 hours. FTIR analysis gave 50 ppm residual SiH. The product, a viscous fluid, had a viscosity of 80,000 cps measured at 25° C.

Example X

Preparation of Crosslinked $Me_3SiO(MeC_6H_{13}SiO)_{200}SiMe_3$ ($MD^6_{200}M$)

To a stirred homogeneous solution of 1-hexene (15 g, 0.62 mol), 1,5-hexadiene (260 mg, 0.1 wt % of reagents) and platinum catalyst (2.4% Pt in toluene, 2.5 ppm, 0.09 ml) was added substantially pure $Me_3SiO(MeHSiO)_{200}SiMe_3$ (20 g, 0.0053 mol) at a dropwise rate over 0.5 h. The reaction exothermed to 100° C. and was maintained at that temperature via external heating for 16 h. FTIR analysis gave 50 ppm residual SiH. The product, a viscous fluid, had a viscosity of 170,000 cps measured at 25° C.

Example XI

Preparation of $Me_3SiO(MeC_6H_{13}SiO)_{30}(MeC_{18}H_{37}SiO)_{30}SiMe_3$

To a stirred homogeneous solution of 1-hexene (29.4 g, 0.35 mol), 1-octadecene (88 g, 0.35) and platinum catalyst (2.4% Pt in toluene, 2.5 ppm, 16 mg) was added substantially pure $Me_3SiO(MeHSiO)_{60}SiMe_3$ (40 g, 0.0106 mol) at a dropwise rate over 3 hours. The reaction exothermed to 90° C. and was maintained at that temperature via external heating for 16 hours. FTIR analysis gave 0 ppm residual SiH. The product was a viscous fluid and had a viscosity of 200 cps measured at 25° C.

Example XII

Preparation of Crosslinked $Me_3SiO(MeC_6H_{13}SiO)_{30}(MeC_{18}H_{37}SiO)_{30}SiMe_3$ To a stirred homogeneous solution of 1-hexene (29 g, 0.35 mol), 1-octadecene (88 g, 0.35 mol), 1,5-hexadiene (0.471 mg, 0.3 wt % of reagents) and platinum catalyst (2.4% Pt in toluene, 2.5 ppm, 16 mg) was added substantially pure $Me_3SiO(MeHSiO)_{60}SiMe_3$ (20 g, 0.0053 mol) at a dropwise rate over 1 hour. The reaction exothermed to 90° C. and was maintained at that temperature via external heating for 17 hour. FTIR analysis gave 0 ppm residual SiH. The product was a viscous fluid and had a viscosity of 800 cps measured at 25° C.

That which is claimed is:

1. A method of making crosslinked siloxanes having n-alkylmethyl groups comprising the steps of
   (i) forming a reaction mixture containing at least one alpha-olefin, a crosslinker, and a catalyst,
   (i) contacting the reaction mixture with at least one substantially pure poly(hydridomethylsiloxane), and
   (iii) agitating the mixture and the catalyst at below 150° C. to form a crosslinked siloxane having n-alkylmethyl groups.

2. A method according to claim 1 in which the alpha-olefin is 1-hexene and the crosslinker is 1,5-hexadiene.

3. A method according to claim 1 in which the alpha-olefin is 1-octadecene and the crosslinker is 1,5-hexadiene.

4. A method according to claim 1 in which the alpha-olefin is a mixture of 1-hexene and 1-octadecene and the crosslinker is 1,5-hexadiene.

5. A method according to claim 1 in which the substantially pure poly(hydridomethylsiloxane) is made by the method comprising (i) forming a reaction mixture containing a silanol-free hexaorganodisiloxane, one or more silanol-free methylhydrogen cyclosiloxanes, and less than about 100 parts per million water, (ii) contacting the reaction mixture with anhydrous trifluoromethane sulfonic acid catalyst, and (iii) agitating the mixture and the catalyst at below 100° C. to form a poly(hydridomethylsiloxane).

6. A method according to claim 1 in which the substantially pure poly(hydridomethylsiloxane) has a degree of polymerization of about 8 to 250.

7. A method according to claim 6 in which the substantially pure poly(hydridomethylsiloxane) has a degree of polymerization of about 9.6.

8. A method according to claim 6 in which the substantially pure poly(hydridomethylsiloxane) has a degree of polymerization of about 60.

9. A method according to claim 1 in which the alpha-olefin is an alkene selected from the group consisting of ethylene, propene, 1-butene, isobutylene (2-methylpropene), 1-pentene (C5), 2-methyl-1-butene, 3-methyl-1-butene, 1-hexene, 2-methyl-1-pentene, 3-methyl-1-pentene, 4-methyl-1-pentene, 1-heptene, 2-methyl-1-hexene, 1-octene, 2-methyl-1-heptene, 1-nonene, 1-decene (C10), 1-undecene, 1-dodecene, 1-tridecene, 1-tetradecene, 1-pentadecene (C15), 1-hexadecene, 1-octadecene, 1-nonadecene, 1-eicosene (C20), and alpha-olefin fractions containing C22–C30+ alpha-olefins.

10. A crosslinked siloxane prepared according to the method in claim 1.

11. A crosslinked siloxane comprising at least one substantially pure poly(hydridomethylsiloxane), at least one alpha-olefin, a crosslinker, and a catalyst.

12. The crosslinked siloxane of claim 11 in which the alpha-olefin is 1-hexene and the crosslinker is 1,5-hexadiene.

13. The crosslinked siloxane of claim 11 in which the alpha-olefin is 1-octadecene and the crosslinker is 1,5-hexadiene.

14. The crosslinked siloxane of claim 11 in which the alpha-olefin is a mixture of 1-hexene and 1-octadecene and the crosslinker is 1,5-hexadiene.

15. The crosslinked siloxane of claim 11 in which the substantially pure poly(hydridomethylsiloxane) is made by the method comprising (i) forming a reaction mixture containing a silanol-free hexaorganodisiloxane, one or more silanol-free methylhydrogen cyclosiloxanes, and less than about 100 parts per million water, (ii) contacting the reaction mixture with anhydrous trifluoromethane sulfonic acid catalyst, and (iii) agitating the mixture and the catalyst at below 100° C. to form a poly (hydridomethylsiloxane).

16. The crosslinked siloxane of claim 11 in which the substantially pure poly(hydridomethylsiloxane) has a degree of polymerization of about 8 to 250.

17. The crosslinked siloxane of claim 16 in which the substantially pure poly(hydridomethylsiloxane) has a degree of polymerization of about 9.6.

18. The crosslinked siloxane of claim 16 in which the substantially pure poly(hydridomethylsiloxane) has a degree of polymerization of about 60.

19. The crosslinked siloxane claim 11 in which the alpha-olefin is an alkene selected from the group consisting of ethylene, propene, 1-butene, isobutylene (2-methylpropene), 1-pentene (C5), 2-methyl-1-butene, 3-methyl-1-butene, 1-hexene, 2-methyl-1-pentene, 3-methyl-1-pentene, 4-methyl-1-pentene, 1-heptene, 2-methyl-1-hexene, 1-octene, 2-methyl-1-heptene, 1-nonene, 1-decene (C10), 1-undecene, 1-dodecene, 1-tridecene, 1-tetradecene, 1-pentadecene (C15), 1-hexadecene, 1-octadecene, 1-nonadecene, 1-eicosene ( C20), and alpha-olefin fractions containing C22–C30+ alpha-olefins.

* * * * *